United States Patent Office 3,433,106
Patented Mar. 18, 1969

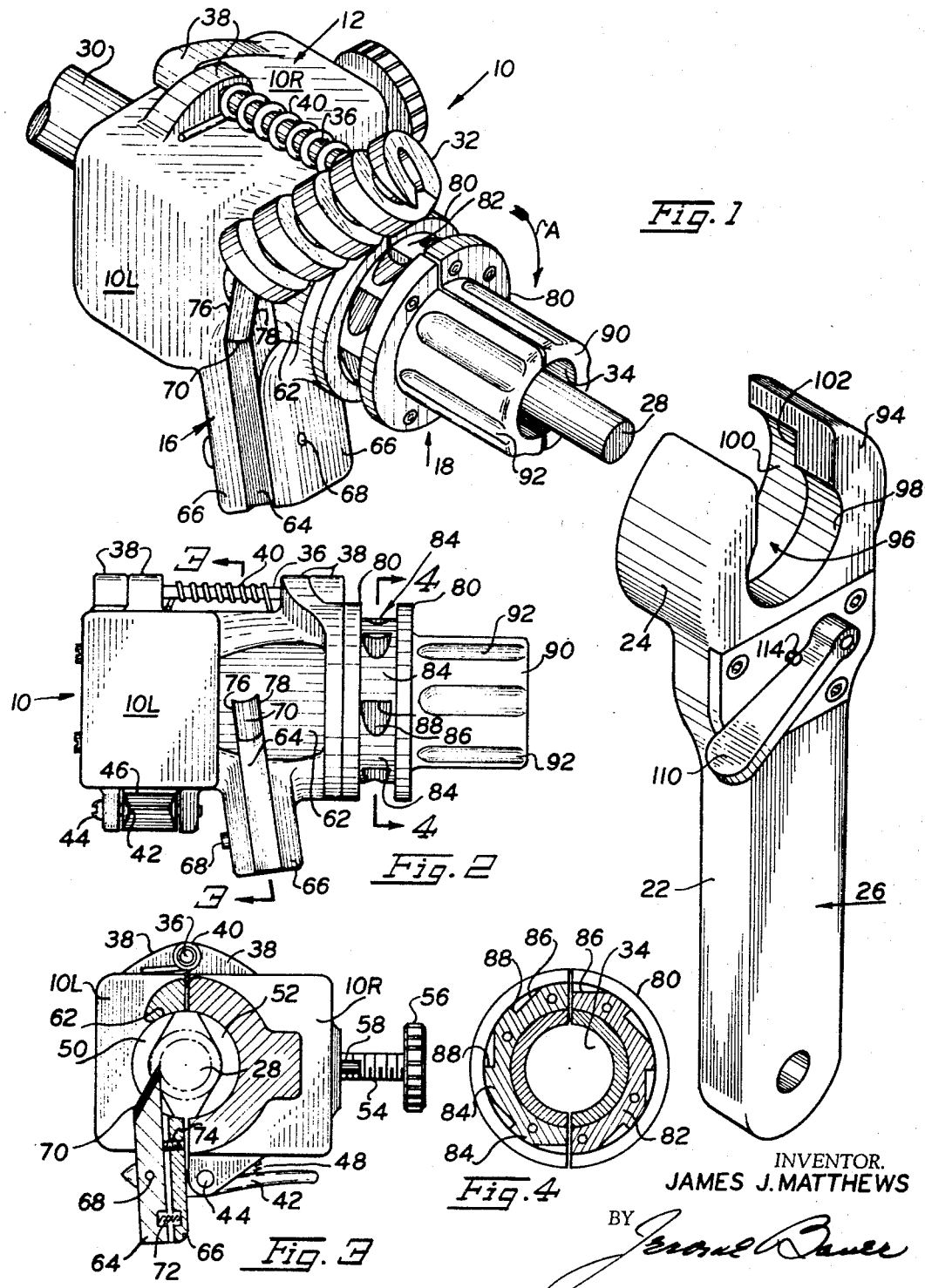

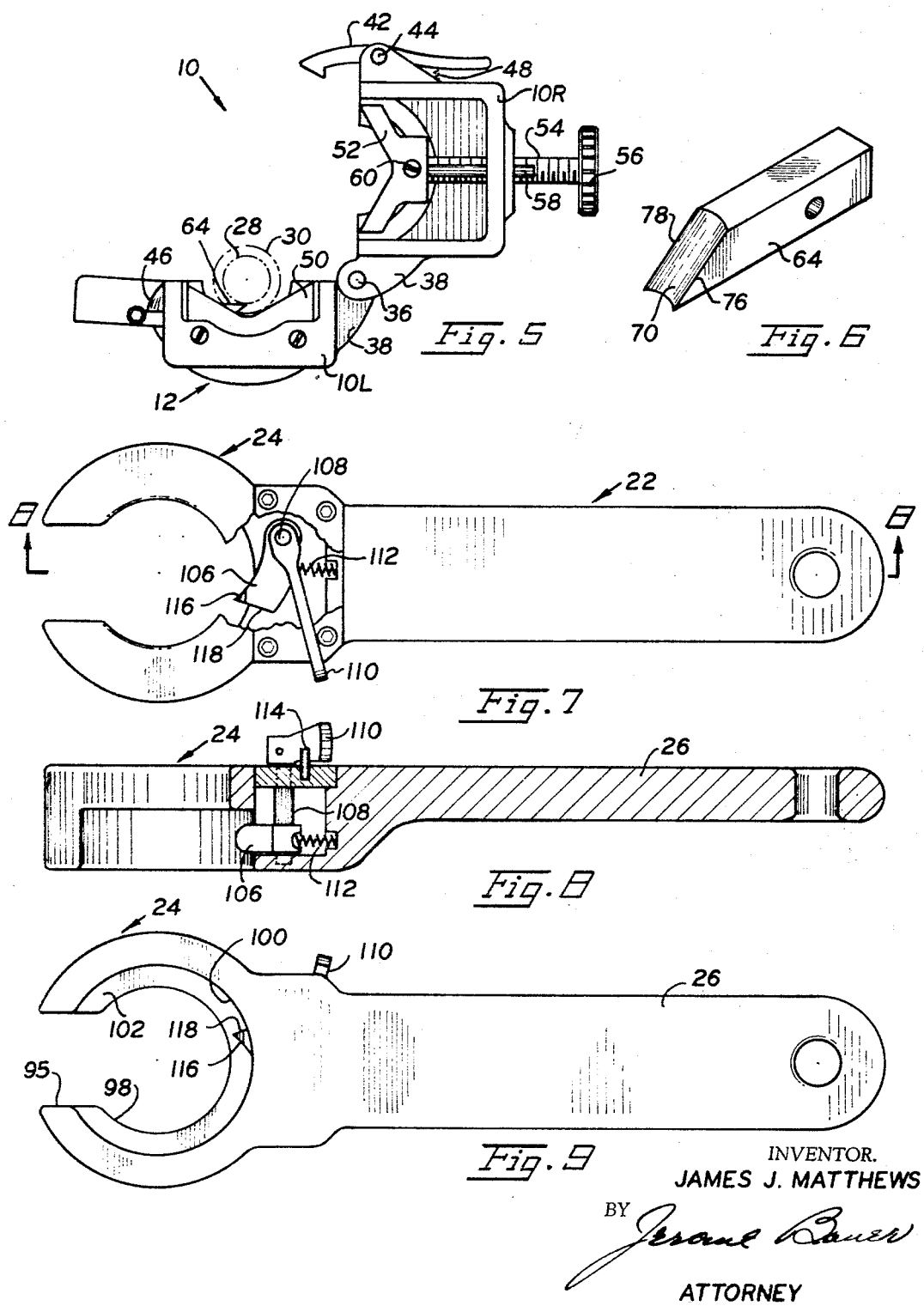

3,433,106
APPARATUS FOR REMOVING INSULATION
James J. Matthews, 14 Woodcrest Road,
Hicksville, N.Y. 11801
Filed July 13, 1967, Ser. No. 653,202
U.S. Cl. 81—9.5       11 Claims
Int. Cl. H02g 1/12

ABSTRACT OF THE DISCLOSURE

An apparatus for removing insulation from the mid-span section of cable or wire comprising a body having arranged therein adjustable clamping means for holding the cable, cutting means and means for rotating said body so as to simultaneously cut and remove the insulation.

This invention pertains to a tool for cutting and stripping insulation form heavy wire and cable and, in particular, to a device for stripping cable from the mid-span or intermediate sections of such work pieces.

Difficulty is often found in stripping mid-span sections because of the weight and size of the cable and its accessibility from the ground. In U.S. Patent 3,204,495 dated Sept. 7, 1965, there is discussed some of the problems involved. In such patent, a device suitable for the removal of insulation from cable strung some distance from the ground is disclosed and is specifically designed to be operated with the use of a "shotgun" extension device, enabling the operator to work removed from the cable.

There are many occasions, however, where the wire is accessible to the reach of the repairman or where the repairman could be brought closer to the cable. For such occasions, it would be more practicable to provide a tool which would be smaller in size and more easily adaptable for direct manual operation.

It is accordingly, an object of this invention, to provide a device which is capable of close manual operation in the stripping of mid-span insulated wire or cable sections.

It is another object of this invention to provide an insulation removing tool having improved means for rotating the same about the cable. In particular, it is an objective to provide a ratchet type, wrench operated means by which the stripping tool is rotated, the wrench by virtue of its ratchet operation not being required to be removed from the tool or adjusted during operation.

It is a further object of the present invention to provide a tool having an improved helical cutting and stripping action and, in particular, to provide a novel cutting element for use in combination with such tool.

It has also been a problem to provide successful stabilizing or clamping means in a mid-span stripping tool which holds the cable under proper restraint during cutting and it is, therefore another object to provide a tool having a novel clamipng device for such purpose. This device being provided with means for adjustably varying the clamp effect on the cable to clamp cables of various sizes for the removal of insulation therefrom.

The above, as well as other objects and advantages, shall be apparent from the structure and arrangements hereinafter described and fully illustrated in the accompanying drawings in which:

FIG. 1 is a perspective view of the device of the present invention, positioned about a mid-span section of cable from which insulation is being removed, the operating wrench device being shown adjacent thereto;

FIG. 2 is a side elevational view of the device without wrench;

FIG. 3 is a cross-sectional view taken along line 3—3 of FIG. 2;

FIG. 4 is a cross-sectional view along lines 4—4 of FIG. 2;

FIG. 5 is a view looking inwardly from the front end of the device;

FIG. 6 is a perspective view of the cutting element;

FIG. 7 is a top plan view of the wrench partially cut away to show the structure of its engaging member;

FIG. 8 is a cross-sectional view taken along line 8—8 of FIG. 7, and

FIG. 9 is a plan view of the underside of the wrench.

The stripping device is formed of an elongated body or casing 10 split into symmetrical halves along a longitudinal axis and generally includes a clamp mechanism 12, a cutting mechanism 16 and a ratchet and guide mechanism 18. A separable wrench 22 having a head portion 24 and a grip portion 26 is adapted to fit over and engage with the ratchet. As seen in FIG. 1, the device is positioned about a cable or wire 28 from which the insulation 30 is being stripped in a helical fashion as at 32. The clamp, cutting and ratchet mechanisms are serially arranged in an integral whole of symmetrically separable right and left half sections defining a cylindrical bore 34 running axially through the device. At the forward end of the device, the right and left half sections of the casing 10 (hereinafter referred to by the subscripts R and L, corresponding to their position in FIG. 1), are hingedly connected at their upper edge by a pin 36 extending through opposed pairs of short adjacent arm members 38. A spring 40 is provided to maintain the two half sections in normally closed condition. The lower edge of the right casing section 10R is provided with a locking device comprising a latch 42 pivoted at 44. A striker member 46 engageable by the latch 42 is formed on the lower edge of the left casing member 10L. A compression spring 48 is provided to normally bias the latch 42 in closed position over the striker 46. This construction insures continued locking of the device about the cable during use, no matter in which direction the device is rotated or turned. Locking is further augmented by wrench 22 in a manner to be further described.

Located inside the left section of the casing 10L is a fixed V-shaped cradle or jaw 50 having a smooth surface on which the insulated wire is adapted to lay. The right half of the casing 10R is provided with a similar but movable jaw 52. Rotatively mounted in the hub of the movable jaw 52, by means of a conventional key and keyway (not shown), is a screw member 54 extending through the wall of the casing 10R. The screw member 54 is threadedly engaged within a bore (not shown) formed in the casing section 10R and is provided with a knob or handle 56. Since the movable jaw 52 is in opposed relationship to the fixed jaw 50, the insulated wire may be placed, as seen in FIG. 3, under selected adjustable pressure by manual turning of the knob or handle 56. This clamping adjustment accommodates cables of various sizes. In addition, a cylindrical pin or rod 58, secured to the movable jaw 52 and freely movable through a corresponding hole in the wall of the casing section 10R, is provided to stabilize the clamp member 52 within the body section. A set screw 60 is used to fasten the rod 58 to the jaw 52. The set screw 60 may be also used as the key for the rotative mounting of the adjustment screw 52.

As noted, the cutting mechanism 16 of this device is located substantially centrally of the casing 10. To accommodate this cutting mechanism, the left hand section 10L is cut away as at 62, exposing the interior of bore 34. A rectangular cutter or knife element 64, having flat faces, mounted in a bracket 66 formed of a pair of opposed arms integral with the body section 10L, extends into the opening 62 at an angle to the longitudinal axis of the device. The cutting element 64 is pivotably mounted about a pin 68 and is biased by a spring 72 so that its cutting face 70, sloping from front to rear, is normally yieldingly urged into the cylindrical bore 34. The spring 72 is retained at its opposite ends in mating bores provided in the bracket 66 and cutting element 64. Adjustable limit means in the form of a set screw 74 is provided to limit the urging by the spring 72 of the cutting edge 70 into the bore 34.

The cutting face 70 is arcuate in configuration and has a leading cutting edge 76 adapted to cut helically into the insulation upon rotation and a trailing edge 78 adapted to simultaneously spirally remove the cut insulation. In the present combination, the arcuate blade 70 is most successful in cutting and stripping the insulation in a continuous spiral as shown at 32 without damage to the cable 28 itself and without the necessity of carefully and most accurately positioning it with respect to the longitudinal and/or transverse axes of the cable.

A ratchet and gripping mechanism is located at the rear end of the casing 10. Both halves of this portion of the casing are symmetrically formed about the central axis and may thus be described best as a unitary element. Adjacent the cutting mechanism 16, there is provided a pair of longitudinally spaced annular ring members 80. Recessed and fixed between the ring members is an annular ratchet wheel structure generally identified by the numeral 82 having a ratchet wheel with a plurality of teeth 84. The annular ring members 80 extend radially outward above the level of the circular ratchet surface 82 to insure that a mating pawl (to be described in greater detail hereinafter) on wrench 22 engages securely with each of the teeth.

The ratchet teeth 84 are identical and symmetrically disposed about the ratchet wheel circumference, each having a concave, sloping, sliding surface 86 and a flat radial stop or indexing surface 88. The teeth are adapted for indexing by the operation of the wrench 22 in a clockwise direction, as shown by arrow A (FIG. 1), and are further adapted for sliding or non-indexing movement on counterclockwise rotation of the wrench. The position of the ratchet faces are, of course, necessitated by the location of the cutting element 16 on the left side of the device. Should the cutting element be placed on the right half of casing 10, the ratchet would merely be reversed and counterclockwise operation would ensue.

Finally, the rearward end of the casing 10 is reduced to form a somewhat elongated cylindrical hand grip 90 having a plurality of axial indentations 92, allowing the repairman a place for conveniently manually grasping and holding the device either in or out of use.

In describing the construction of wrench 22, reference is made to FIGS. 1, 7 and 9. The head 24 is a split annulus 94, permitting it to easily encircle a mid-span section of cable. The opening 95 defining the split in the annulus 94 is sufficiently large to enable the wrench 22 to be placed about the cable to be stripped. This is done by moving the wrench 22 toward the cable until the cable enters the annulus 94 through the opening 95. The annulus 94 is provided with a bore 96 cut in two diametral sizes.

The small diametral portion 98 is formed adjacent the outer face of the wrench 22 and the larger diametral portion 100 is formed adjacent the inner face and is of a size sufficient to pass over the annular rings 80 on either side of the ratchet 82.

It is preferred that the annular portions 98 and 100 are made with substantially the same diameters as the diameters of the rings 80 and the hand grip 90 so that, while the head 24 can slide over them, there will be relatively little free play therebetween. The shoulder 102 formed between the two diametral portions is adapted to abut the rearwardmost of the rings 80 and to thereby limit, as well as stabilize, axial movement of the wrench over the ratchet.

Extending into the bore 96, formed by the larger annular head portion 100, is a pivotal pawl 106 fixed on a rotating stem 108 mounted through the outer face of the wrench handle 26. Fixed to the outer end of the stem is a finger lever 110 for simple movement of the pawl 106 out of the bore 96. The pawl is normally biased into the bore 96 by spring mechanism 112, however, a pin 114 is fixed into the outer face of the wrench 22, engaging the finger lever 110 to prevent the spring 112 from excessively pivoting the pawl.

The pawl 106 is provided with an arcuate surface 116 and a flat edge surface 118, the arcuate surface 116 being designed to ride or slide over the teeth 84 of the ratchet in counterclockwise movement as described, the flat surface 118 being adapted to engage the stop or indexing surface 88 of ratchet teeth 84 in clockwise movement of the wrench. As with the ratchet 82, the construction of the wrench 22 and pawl 106 would be reversed if the device were to be made to operate in counterclockwise manner.

The operation and use of this device suggests itself readily from the preceding description. It will be appreciated, of course, that mid-span sections of cable have fixed and/or inaccessible ends. Therefore, this device, devoid for the moment of wrench 22, is opened by releasing latch 42, and placed about the cable section to be stripped. The device is then permitted to close and is locked securely by engaging the latch 42 over the striker 46. The knob 56 is then manually turned to adjust the jaw 52, preferably to exert a pressure on the cable sufficient to stabilize the tool about the cable 28 without distortion of the insulation and without interference with the rotation of the tool about the cable. It should be noted that the jaws clamping about the insulation create a force tending to open the casing halves and thus continually insure that the latch 42 once closed remains secure over the striker even during use.

It will be appreciated here that the shape of the jaws, while preferred as shown, can be changed. In addition, other clamping means such as roller bearings, spring fingers, etc. can be equally employed as well, it should also be observed that the clamping action of the present device is remote from and, in fact, it precedes the cutting mechanism. Thus, the insulation will not be cut when under pressure or in a distorted state, yet the device is constantly stabilized during use, and in a position prior to that of the cutting mechanism 16.

Upon stabilization of the casing 10 about the cable, the wrench head 24 is placed over the ratchet mechanism. This is done by moving the wrench toward the cable and causing the cable to enter through the opening 95 of the annulus 94. The wrench is then moved lengthwise along the cable and over the hand grip 90. The finger lever 110 is then depressed so as to withdraw or retract the pawl 106 so that the wrench circumferentially overrides the rearmost annular ring 80. Upon release of the finger lever, the pawl 106 swings outward and becomes firmly seated over the ratchet wheel. It was noted before, the wrench head 24 additionally augmented the locking of the casing halves. This results from providing the head 24 with annular dimensions substantially equal to the diameter of the rings 80 and the hand grip 90 so that by placing the wrench in operative position, it will hold the two half sections securely together.

During the aforedescribed placement of the device about the cable, the cutting element 64 yieldingly rests upon the outer surface of the insulation 30 with its narrow front side resting squarely upon the surface. Upon rotation of the device, in the manner explained hereafter, the leading edge 78 is forced to engage and cut into the insulation. The annular disposition of the cutter 64 in the bracket 66 causes the leading edge 78 to progress in a helical path about the cable 28, continuously cutting the insulation. The trailing edge 76 simultaneously and spirally removes the cut insulation as shown in FIG. 1.

In general, the action of the cutting mechanism here is similar to the cutting action of the device in the aforementioned patent—U.S. 3,204,495. However, by merely placing the present cutting face, with its front side squarely to the cable, no concern need be had as to the "tangential" position of the cutting edge or the length or angles to which the element extends into bore 34 with respect to the axes of the cable. As will be clearly seen in FIG. 3, the front side cutting element 64, after having stripped the insulation, continues to abut the cable 28 squarely. At no time is either the cutting edge or trailing edge of the arcuate surface in direct contact with the cable wire itself.

Rotation of the device is of course accomplished by operating the wrench 22 so that the flat face 118 of the pawl 106 is made to engage the stop surface 88 of the ratchet. The wrench can be thus moved, relatively back and forth, over small distances to effect a continued rotation of the device. The ratchet and pawl permitting continued rotation for the completion of the stripping operation without removal of the wrench.

Because of the progression of the cutter through the insulation, the device moves axially farward while the insulation is helically stripped. When the desired length of insulation is removed, the operator exerts a slight twist to the device preventing it from farther axial movement but continuing to sever the last bit of insulation. The forward cutting edge thus cuts the edge of insulation radially 360° cleanly, squarely and completely. The device may then be simply removed from the cable, by removing the wrench and opening the latch.

I have thus shown a simple, unique insulation, cutting and removal tool having adjustable clamp means, a novel cutting element and a ratchet-wrench rotating means. While there have been shown and described and pointed out, the fundamental novel features of the invention, it will be understood that various substitutions and changes in the form and details of the device illustrated may be made by those skilled in the art, without departing from the spirit of the invention. It is the intention, therefore, to be limited only as indicated by the scope of the claims appended hereto.

I claim:

1. Apparatus for removing insulation from cables or wires of various sizes comprising
   a body formed of a pair of hingedly joined members defining a cylindrical bore for surrounding and for rotation relative to a cable,
   said body having serially arranged from front to rear, a clamp mechanism operable between open and closed positions and adjustable for exerting a variable force on and rotatable relative to said cable, an external opening in said body, a cutting mechanism in said opening for cutting and removing said insulation externally through said opening on rotation of said body relative to the cable, and ratchet wheel parts defined at the rear of said body,
   said body being further provided with latch means located adjacent said clamp mechanism at the front of said body to releasably latch said clamp mechanism closed, said parts defining a complete ratchet wheel at the rear of said body when said clamp mechanism is closed, and means engageable with said complete ratchet wheel for manually rotating said body and disengageable from said ratchet wheel.

2. The apparatus according to claim 1, in which said body parts are axially extended at its rearward end to form a cylindrical manual gripping section and cable guide member.

3. The apparatus according to claim 1, wherein the ratchet wheel is defined by a pair of spaced annular split rings secured to the body and a plurality of radially disposed ratchet teeth fixed therebetween. and wherein the means for rotating the body comprises a manually operable wrench having an annular head provided with an opening for passage of the cable therethrough, a retractable pawl adapted to engage said ratchet teeth, and an inner surface slidably engaging said split rings.

4. The apparatus according to claim 3, wherein said wrench is provided with a finger lever for retracting said pawl and stop means for limiting the movement of said lever.

5. The apparatus according to claim 1, wherein said clamp mechanism comprises a fixed clamp member, and a movable clamp member located on opposite sides of said bore, said movable clamp member being provided with means for adjusting its distance from said fixed member.

6. The apparatus according to claim 1, wherein said clamp mechanism comprises a first jaw fixed in one of the body members, a second jaw movably mounted to the other of said body member, screw means rotatably secured at one end to said second jaw and extending outwardly of said body member, said screw means being secured in bearing means formed in the wall of said body, said jaws disposed about the bore of said body to clamp the cable therebetween on rotation of said screw means.

7. The apparatus according to claim 6, in which each of said jaws is formed of an axially extending V-shaped member having a smooth surface and is disposed in opposed relationship to the other.

8. The apparatus according to claim 1, in which the cutter mechanism comprises a generally rectangular member having substantially flat surfaces, said member being provided at one end with an arcuate cutting face sloping from front to rear having along one side a leading insulation cutting edge and along the opposite side a trailing insulation removing edge, said cutting member being yieldingly mounted in said body with its cutting face extending angularly into the bore and its front maintained squarely with respect to the cable.

9. Apparatus for removing insulation from a cable or wire comprising a body having a bore therein for surrounding the cable,
   a cutting element mounted in said body, toothed ratchet wheel means mounted on said body, separate wrench means separably engageable with said ratchet wheel for manually rotating said body, said separate wrench means having an annular head for fitting over said ratchet, and pawl means engaging the teeth of said ratchet wheel when so fitted and preventing the separation of said wrench from said ratchet.

10. The apparatus according to claim 1, wherein said wrench has an opening defined in the head thereof to enable a cable to be stripped to enter said head and means on said wrench operable to disengage said pawl from the ratchet teeth to enable the separation of said wrench from said ratchet.

11. The apparatus according to claim 1, including clamp means adjustable from without the body for maintaining said cable under selective pressure in said body.

References Cited

UNITED STATES PATENTS

| | | | |
|---|---|---|---|
| 406,077 | 7/1889 | Anderson | 30—98 |
| 3,161,088 | 12/1964 | Tolman. | |
| 3,204,495 | 9/1965 | Matthews. | |

FOREIGN PATENTS 727,943  11/1942  Germany.

MILTON S. MEHR, *Primary Examiner.*

U.S. Cl. X.R.

200—61.48; 340—61, 67, 81, 262